US005791375A

United States Patent [19]

Pan et al.

[11] Patent Number: 5,791,375

[45] Date of Patent: Aug. 11, 1998

[54] VALVE CONTROL

[75] Inventors: Jeffrey Y. Pan, Lake Forest; Donald Ver Lee, Libertyville, both of Ill.

[73] Assignee: Abbott Laboratories, Abbott Park, Ill.

[21] Appl. No.: 694,045

[22] Filed: Aug. 8, 1996

Related U.S. Application Data

[62] Division of Ser. No. 399,081, Mar. 8, 1995.

[51] Int. Cl.[6] ........ F16K 31/12

[52] U.S. Cl. ........ 137/597; 251/29

[58] Field of Search ........ 251/61.1, 25, 26, 251/28, 29; 137/597, 907

[56] References Cited

U.S. PATENT DOCUMENTS

| | | | |
|---|---|---|---|
| 1,664,493 | 4/1928 | Smith | 251/28 X |
| 3,083,943 | 4/1963 | Stewart, Jr. et al. | 251/61 |
| 3,286,977 | 11/1966 | Miottel | 251/46 |
| 3,312,238 | 4/1967 | Voit, Jr. | 251/61.1 |
| 3,477,693 | 11/1969 | Bezanis | 251/251 |
| 3,540,477 | 11/1970 | Hogel | 137/608 |
| 3,600,953 | 8/1971 | Isreeli et al. | 73/423 A |

(List continued on next page.)

FOREIGN PATENT DOCUMENTS

| | | | |
|---|---|---|---|
| 420 296 A1 | 3/1991 | European Pat. Off. | G01N 35/08 |
| 562 694 A1 | 9/1993 | European Pat. Off. | F16K 11/02 |

OTHER PUBLICATIONS

Branebjerg, Jens and Peter Gravesen, "A New Electrostatic Actuator providing improved Stroke length and Force", IEEE Micro Electro Mechanical Systems '92, Travelmünde, Germany, Feb. 4–7, 1992, pp. 6–11.

Huff, Michael A. et al. "A Pressure–Balanced Electrostatically–Actuated Microvalve". IEEE Solid–State Sensor and Actuator Workshop, Technical Digest, Hilton Head, S.C., Jun. 4–7, 1990, pp. 123–127.

Huff, Michael A. et al. "A Threshold Pressure Switch Utilizing Plastic Deformation of Silicon". IEEE 91CH2817–5/91/0000–0177, 1991, pp. 177–180.

Jensen, D.F. "Pneumatic Digital Control of a Synchronous Device". *Fluidics Quarterly* vol. 1 No. 1, 1967, pp. 27–37.

Manning, J.R. "Fluidic Control Devices and Systems". *Fluidics Quarterly*, ca. 1970.

Ohnstein, T. et al. "Micromachined Silicon Microvalve". IEEE Micro Electro Mechanical Systems, Napa Valley, CA, Feb. 11–14, 1990, pp. 95–98.

*Primary Examiner*—John Fox
*Attorney, Agent, or Firm*—Mark C. Bach

[57] ABSTRACT

Embodiments described herein relate to methods and structures for controlling a valve. One embodiment provides a valve control comprising a first valve fluidly connected with a first fluid conveying conduit and a second fluid conveying conduit. The first valve is movable between a first position where fluid communicates between the first fluid conveying conduit and the second fluid conveying conduit and a second position where fluid does not communicate between the first fluid conveying conduit and the second fluid conveying conduit. A first source of relatively increased pressure and a first source of relatively reduced pressure are provided. A third conduit fluidly connects the first source of relatively increased pressure and the first source of relatively reduced pressure with the first valve. A third valve is fluidly connected with the third conduit. The third valve is movable between a first position where the first source of relatively increased pressure is fluidly connected with the third conduit and the first valve thereby moving the first valve toward its second position and a second position where the first source of relatively reduced pressure is fluidly connected with the third conduit and the first valve thereby moving the first valve toward its first position. A second valve is fluidly connected with the third conduit between the third valve and the first valve. The second valve is movable between a first position where fluid communicates between the first valve and the third valve and a second position where no fluid communicates between the first valve and the third valve.

2 Claims, 1 Drawing Sheet

U.S. PATENT DOCUMENTS

| | | | |
|---|---|---|---|
| 3,749,353 | 7/1973 | Pauliukonis | 251/61.1 |
| 3,934,611 | 1/1976 | Gachot et al. | 137/603 |
| 4,070,004 | 1/1978 | Friswell | 251/331 |
| 4,119,120 | 10/1978 | Mehaffy et al. | 137/885 |
| 4,168,724 | 9/1979 | Graffunder et al. | 137/606 |
| 4,239,494 | 12/1980 | Clements . | |
| 4,259,291 | 3/1981 | Smythe | 422/82 |
| 4,304,257 | 12/1981 | Webster | 137/559 |
| 4,353,243 | 10/1982 | Martin | 73/23.1 |
| 4,399,362 | 8/1983 | Cormier et al. | 250/430 |
| 4,479,762 | 10/1984 | Bilstad et al. | 417/395 |
| 4,517,303 | 5/1985 | Saros . | |
| 4,601,881 | 7/1986 | Webster | 422/67 |
| 4,703,913 | 11/1987 | Hunkapiller | 251/61.1 |
| 4,721,133 | 1/1988 | Sundblom | 251/61.1 |
| 4,848,722 | 7/1989 | Webster | 251/61.1 |
| 4,852,851 | 8/1989 | Webster | 251/61.1 |
| 4,853,336 | 8/1989 | Saros et al. | 436/53 |
| 4,858,833 | 8/1989 | Webster | 251/61.1 |
| 5,045,473 | 9/1991 | Cassaday et al. | 436/53 |
| 5,149,658 | 9/1992 | Cassaday | 436/53 |
| 5,203,368 | 4/1993 | Barstow et al. | 137/597 |
| 5,391,353 | 2/1995 | Graffunder | 422/103 |

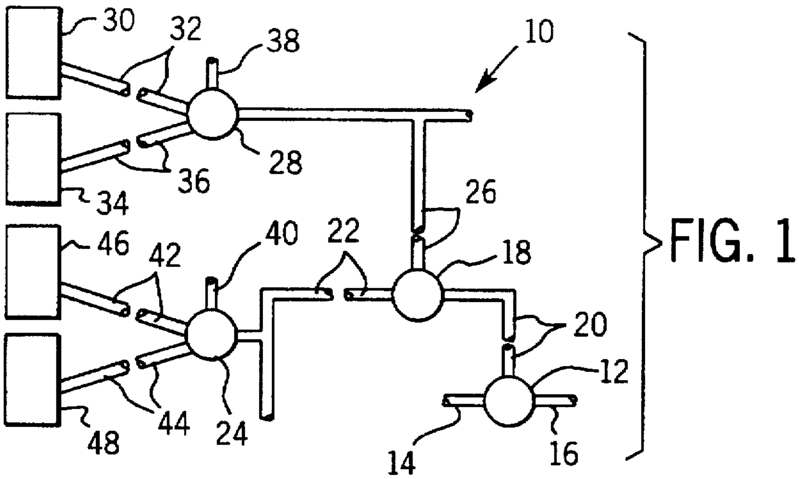
FIG. 1
FIG. 2
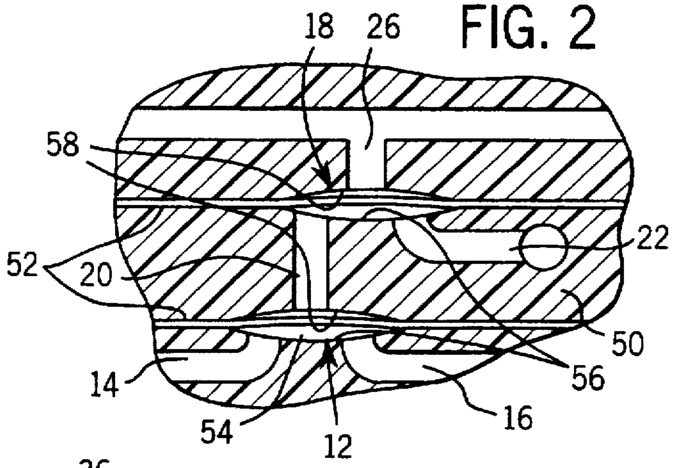
FIG. 3
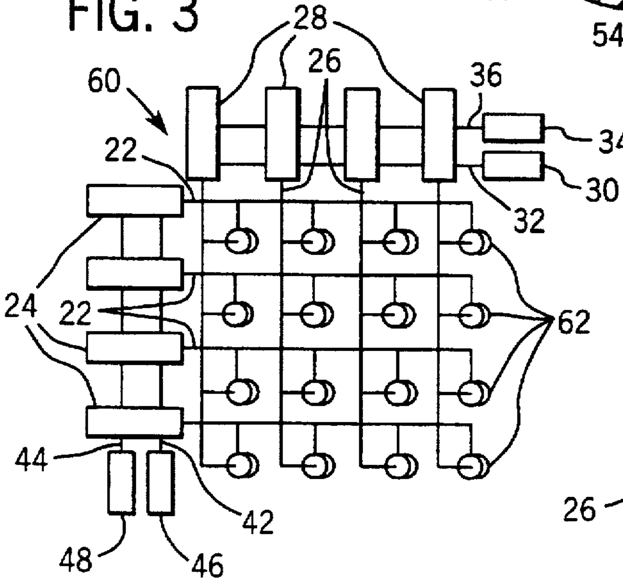
FIG. 4
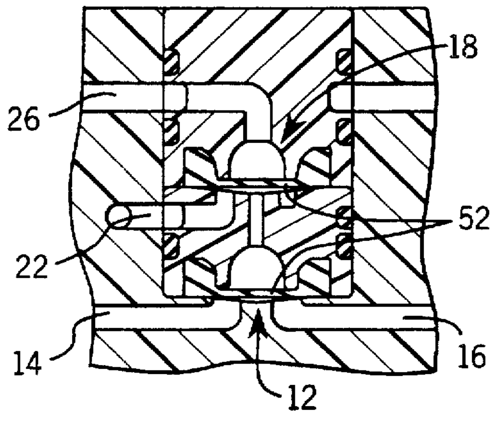

VALVE CONTROL

This case is a divisional patent application of Ser. No. 08/399,081 filed on Mar. 8, 1995 and assigned to the assignee of the present case.

BACKGROUND OF THE INVENTION

Embodiments of the present invention relate generally to controlling a valve. Specifically, embodiments described herein relate to a valve control and a method for controlling a valve, or an array of valves.

In some uses, a pneumatically actuated and controlled valve, for example, may be used in a valve array comprising multiple valves. The position of each valve, i.e. open or closed, may be changed by applying a relatively reduced pressure or a relatively increased pressure, respectively, to the valve. For each valve to be controlled independently, each valve is operatively connected with its own control valve which may be a relatively expensive solenoid valve. Thus, two valves are needed to perform a certain task, one to perform the task and one to control the valve performing the task. This arrangement may be bulky and costly to manufacture and to use. Thus, it is desirable to have an improved way of controlling a valve. In one improvement, a given control valve, such as a solenoid valve, may be "shared" or used by a number of other valves through a network. Sharing of valves may result in cost savings, size and weight reductions, and/or reduction in complexity of the overall design of the valve array and its associated control structure.

SUMMARY OF THE INVENTION

One embodiment provides a valve control comprising a first valve fluidly connected with a first fluid conveying conduit and a second fluid conveying conduit. The first valve is movable between a first position where fluid communicates between the first fluid conveying conduit and the second fluid conveying conduit and a second position where fluid does not communicate between the first fluid conveying conduit and the second fluid conveying conduit. A first source of relatively increased pressure and a first source of relatively reduced pressure are provided. A third conduit fluidly connects the first source of relatively increased pressure and the first source of relatively reduced pressure with the first valve. A third valve is fluidly connected with the third conduit. The third valve is movable between a first position where the first source of relatively increased pressure is fluidly connected with the third conduit and the first valve thereby moving the first valve toward its second position and a second position where the first source of relatively reduced pressure is fluidly connected with the third conduit and the first valve thereby moving the first valve toward its first position. A second valve is fluidly connected with the third conduit between the third valve and the first valve. The second valve is movable between a first position where fluid communicates between the first valve and the third valve and a second position where no fluid communicates between the first valve and the third valve.

Another embodiment offers a method for controlling a valve. In this embodiment, a first valve is fluidly connected with a first fluid conveying conduit and a second fluid conveying conduit. The first valve is moved between a first position where fluid communicates between the first fluid conveying conduit and the second fluid conveying conduit and a second position where fluid does not communicate between the first fluid conveying conduit and the second fluid conveying conduit. A first source of relatively increased pressure and a first source of relatively reduced pressure are fluidly connected with the first valve by a third conduit. A third valve is fluidly connected to the third conduit. The third valve is moved between a first position where the first source of relatively increased pressure is fluidly connected with the third conduit and the first valve thereby moving the first valve toward its second position and a second position where the first source of relatively reduced pressure is fluidly connected with the third conduit and the first valve thereby moving the first valve toward its first position. A second valve is fluidly connected with the third conduit between the third valve and the first valve. The second valve is moved between a first position where fluid communicates between the first valve and the third valve and a second position where no fluid communicates between the first valve and the third valve.

An additional embodiment provides a valve control comprising a first valve fluidly connected with a first fluid conveying conduit and a second fluid conveying conduit. The first valve is movable between a first position where fluid communicates between the first fluid conveying conduit and the second fluid conveying conduit and a second position where no fluid communicates between the first fluid conveying conduit and the second fluid conveying conduit. A memory conduit is fluidly connected with the first valve for maintaining the first valve in the first position or the second position. A second valve is fluidly connected with the first valve and the memory conduit for either moving the first valve between the first position and the second position or for maintaining a pressure state of the memory conduit for keeping the first valve in either the first position or the second position depending upon the pressure state of the memory conduit.

A further embodiment offers a method of controlling a valve. In this method, a first valve is fluidly connected with a first fluid conveying conduit and a second fluid conveying conduit. The first valve moves between a first position where fluid communicates between the first fluid conveying conduit and the second fluid conveying conduit and a second position where no fluid communicates between the first fluid conveying conduit and the second fluid conveying conduit. A second valve is fluidly connected with the first valve. A memory conduit is fluidly connected fluidly between the first valve and the second valve for maintaining the first valve in the first position or the second position. The second valve is moved to move the first valve between the first position and the second position. The second valve is moved to maintain a pressure state of the memory conduit for keeping the first valve in either the first position or the second position depending upon the pressure state of the memory conduit.

Yet another embodiment provides another method of controlling a valve. Here, a number of first valves are provided. Each of the number of first valves is fluidly connected with a first fluid conveying conduit and a second fluid conveying conduit. Each of the first valves is movable between a first position where fluid communicates between the first fluid conveying conduit and the second fluid conveying conduit and a second position where no fluid communicates between the first fluid conveying conduit and the second fluid conveying conduit. At least one second valve is fluidly connected with each of the number of first valves with at least one memory conduit. A source of relatively increased pressure or relatively reduced pressure is fluidly connected with the at least one second valve. The at least one second valve is movable between a first position where the source of relatively increased pressure or relatively reduced pressure is fluidly connected with the at least one memory conduit and a second position where the source of relatively increased pressure or relatively reduced pressure is not fluidly connected with the at least one memory conduit. The at least one second valve is moved toward its first position to fluidly connect the at least one memory conduit and a first subset of the number of first valves with the source of relatively increased pressure or relatively reduced pressure and to move the first subset of the number of first valves toward a first predetermined one of its first position and its second position responsive to the relatively increased pressure or the relatively reduced pressure. The at least one second valve is moved toward its second position thereby maintaining the first subset of the number of first valves in the first predetermined one of its first position and its second position. The source of relatively increased pressure or relatively reduced pressure is fluidly connected with a second subset of the number of first valves to move the second subset of the number of first valves toward a second predetermined one of its first position and its second position responsive to the relatively increased pressure or the relatively reduced pressure.

BRIEF DESCRIPTION OF THE DRAWINGS

FIG. 1 is a generic schematic diagram of an embodiment used to control a valve;

FIG. 2 is a sectional view of a portion of another embodiment similar to the embodiment of FIG. 1;

FIG. 3 is a schematic view of an exemplary valve array utilizing portions of the embodiment of FIG. 1; and FIG. 4 is a sectional view of another embodiment similar to the embodiment of FIG. 2.

DETAILED DESCRIPTION OF PREFERRED EMBODIMENTS

FIG. 1 generally illustrates an embodiment 10 and a method for controlling a first valve 12. For the sake of clarity, the embodiment 10 and method are initially disclosed herein with respect to controlling only the first valve 12. However, it is to be recognized that the embodiment 10 and method may be used, with suitable modifications, to control a desired number of valves. Further, for the sake of clarity of understanding, the embodiment 10 is discussed with respect to a particular valve construction, illustrated in FIG. 2. Other constructions of the embodiment 10, such as that illustrated in FIG. 4 comprising an insert valve, are also possible. But, the embodiment 10 may be used, again with suitable modifications, to control valves of any appropriate construction. A valve may be controlled fluidly, electrostatically, electromagnetically, mechanically or the like. Additionally, method steps disclosed herein may be performed in any desired order and steps from one method may be combined with steps of another method to arrive at yet other methods. The embodiment 10 and method may be used to control a valve employed in any suitable type of fluidic system. The fluidic system may be incorporated into any suitable structure, such as an analytical instrument and the like. In some embodiments, the first valve 12, and other valves, may be a flow through valve fluidly connected with a fluid conveying conduit. Flow through valves are discussed, for instance, in copending United States patent application, Ser. No. 08/334,902, filed on Nov. 7, 1994 and assigned to the assignee of the present case. The entire disclosure of that copending patent application is incorporated herein by reference. Accordingly, the first fluid conveying conduit 14 and the second fluid conveying conduit 16 may be portions of the same fluid conveying conduit.

Referring to FIG. 1, the first valve 12 is fluidly connected between a first fluid conveying conduit 14 and a second fluid conveying conduit 16 such that operation of the first valve 12 determines whether or not fluid communicates between conduits 14 and 16. Specifically, when the first valve 12 is in a first position, fluid communicates between conduits 14 and 16, and when the first valve 12 is in a second position, fluid does not communicate between the conduits 14 and 16. Any desired fluid, such as gasses, liquids and the like, may be present in conduits 14 and 16. The first valve 12 is fluidly connected to a second valve 18 by a control or memory conduit 20. In some embodiments, there may be multiple second valves 18 fluidly connected with a single first valve 12. In other embodiments, there may be multiple first valves 12 fluidly connected with a single second valve 18. Pressure in the control conduit 20 determines operation of the first valve 12. Thus, the control conduit 20 may be understood to be a memory conduit in that the pressure maintained in the memory conduit 20 maintains the first valve 12 in either the first position or the second position, i.e. the memory conduit 20 "remembers" the last pressure state applied to or the last position of the first valve 12. Thus, the pressure state of the memory conduit 20 determines the position of the first valve 12.

Operation of the second valve 18 determines pressure in the control conduit 20. Specifically, when the second valve 18 is in a first position, a third conduit 22 is fluidly connected with the control conduit 20 such that pressure in the third conduit 22 is exposed to the control conduit 20. When the second valve 18 is in a second position, the third conduit 22 does not fluidly communicate with the control conduit 20 and the pressure in the control conduit 20 is independent of or isolated from the pressure in the third conduit 22.

The second valve 18 is fluidly connected by the third conduit 22 to a third valve 24 and is fluidly connected by a fourth conduit 26 to a fourth valve 28. Pressure within the fourth conduit 26 controls operation of the second valve 18. In some embodiments, the second valve 18 may be maintained in either the first or second position by mechanical means, such as a spring and the like. In these embodiments, one of the pressure sources may not be needed and therefore it and associated structures may be eliminated. In any case, operation of the second valve 18 determines whether or not the control conduit 20 communicates fluidicly with the third conduit 22. In a particular embodiment, the fluid present in the control conduit 20 is a gas such as air and the like.

The fourth valve 28 is fluidly connected with a source 30 of relatively reduced pressure by a fifth conduit 32 and is fluidly connected with a source 34 of relatively increased pressure by a sixth conduit 36. The fourth valve 28 is operatively coupled with a controller, not shown, by connector 38, which may convey to the fourth valve 28 any suitable signal, such as an electronic signal, a fluidic or pneumatic signal and the like, for controlling operation of the fourth valve 28. Operation of the fourth valve 28 determines whether the source 30 or the source 34 is fluidly connected with the fourth conduit 26. When in a first position, the fourth valve 28 fluidly connects the sixth conduit 36 with the fourth conduit 26. In a second position, the fourth valve 28 fluidly connects the fifth conduit 32 with the fourth conduit 26.

In an exemplary embodiment, the source 30 provides a relatively reduced pressure that is approximately less than ambient pressure whereas the source 34 provides a relatively increased pressure which is approximately more than ambient pressure. The pressures provided by the sources 30 and 34 are predetermined for operating the second valve 18. In one embodiment, the pressure provided by source 34 is approximately more than the highest pressure expected to be present at any time in the control conduit 20 or the third conduit 22. Likewise, the pressure provided by source 30 is approximately less than the pressure expected at any time to be present in conduits 20 or 22. In a particular embodiment, the source 30 provides a relatively reduced pressure of about 20 inches of mercury and the source 34 provides a relatively increased pressure of about 20 psig. In some embodiments, the sources 30 and 34 may be integrated, such as in the form of a variable pressure source, e.g. a regulator, piston pump, and the like, which provide a relatively increased pressure or a relatively reduced pressure, as desired. In these embodiments, the fourth valve 28 and sources 30 and 34 may be eliminated.

The third valve 24 is operatively coupled with a controller, which is not shown, but may be the same as or substantially similar to the first-mentioned controller, by connector 40, which may convey to the third valve 24 any suitable signal, such as an electronic signal, a pneumatic signal and the like, for controlling operation of the third valve 24. In some embodiments, the connectors 38 and 40 may be replaced by mechanical actuators which operate the respective valves 24 and 28. In other embodiments, the third and fourth valves 24 and 28, respectively, may be electrically actuated, e.g. a solenoid valve, or mechanically actuated, e.g. by a spring.

The third valve 24 fluidly connects the third conduit 22 with either a seventh conduit 42 or an eighth conduit 44. The seventh conduit 42 fluidly connects the third valve 24 with a source 46 of relatively reduced pressure and the eighth conduit 44 fluidly connects the third valve 24 with a source 48 of relatively increased pressure. In a first position, the third valve 24 fluidly connects the eighth conduit 44 with the third conduit 22. In a second position, the third valve 24 fluidly connects the seventh conduit 42 with the third conduit 22.

In an exemplary embodiment, the source 46 provides a pressure which is approximately less than ambient pressure and the source 48 provides a pressure which is approximately more than ambient pressure. The pressures provided by the sources 46 and 48 are predetermined for operating the first valve 12. In a specific embodiment, the pressure provided by the source 48 is approximately more than the highest pressure expected to be present at any time in conduits 14 or 16 and the pressure provided by source 46 is approximately less than the pressure expected to be present at any time in conduits 14 or 16. In a specific embodiment, the source 46 provides a relatively reduced pressure of about 15 inches of mercury and the source 48 provides a relatively increased pressure of about 15 psig. In some embodiments, the sources 46 and 48 may be integrated, such as in the form of a variable pressure source, e.g. a regulator, piston pump, and the like. In these embodiments, the third valve 24 and sources 46 and 48 may be eliminated.

In a particular embodiment, with respect to the sources 30, 34, 46 and 48, the absolute pressure, i.e. pressure value with respect to vacuum, provided by source 34 is approximately more than the absolute pressure provided by source 48. The absolute pressure provided by source 48 is approximately more than the highest pressure expected at any time to be present in conduits 14 and 16. The absolute pressure provided by source 30 is approximately lower than the absolute pressure provided by source 46. The absolute pressure provided by source 46 is approximately less than the lowest pressure expected at any time to be present in conduits 14 and 16. Pressure differentials exist among the sources 30, 34, 46 and 48 and the conduits 14 and 16. These pressure differentials assist in intended operation of the embodiment 10.

Illustrating by example, the embodiment 10 may be used with a membrane valve shown in FIG. 2. The membrane valve may be constructed by forming channels or conduits and spaces in a block 50 of material, such as a polymer and the like. The valve comprises a flexible member 52 which moves within the spaces formed in the block 50 responsive to a pressure exposed to the flexible member 52. More than one block 50 and more than one flexible member 52 may be used. For instance, a flexible member 52 may be placed between two blocks 50.

Considering valves 12 and 18, conduits 14 and 16 are fluidly connected with a volume 54 bounded by a first recessed surface 56 and the flexible member 52. A side of the flexible member 52 opposite to the side thereof facing the first recessed surface 56 faces a second recessed surface 58. The control conduit 20 terminates at the second recessed surface 58 such that pressure present in the control conduit 20 is exposed to the flexible member 52. When pressure in the control conduit 20 is approximately less than the fluid pressure in either conduit 14 or conduit 16, the flexible member 52 is moved toward the second recessed surface 58 thereby allowing fluid communication between conduits 14 and 16 through the volume 54. When the pressure in the control conduit 20 is approximately more than the pressure present in both conduits 14 and 16, the flexible member is moved toward the first recessed surface 56. With the flexible member 52 in this position, fluid communication between the conduits 14 and 16 is interrupted or limited.

Referring to FIGS. 1 and 2, when the fourth valve 28 is in the first position, the relatively increased pressure from the source 34 is applied through the sixth conduit 36, the fourth valve 28 and the fourth conduit 26 to the side of the flexible member 52 facing the second recessed surface 58 of the second valve 18. The flexible member 52 moves toward the first recessed surface 56 of the second valve 18 thereby limiting fluid flow or fluid communication between the third conduit 22 and the control conduit 20. Thus, the pressure in the third conduit 22 may be varied by operation of the third valve 24 without effecting the first valve 12. Even when the relatively increased pressure from the source 48 is applied to the third conduit 22, the position of the second valve 18 is not changed. There is no fluid communication between the third conduit 22 and the control conduit 20. Pressure present in the fourth conduit 26 is approximately more than the pressure present in the third conduit 22 and the pressure present in the control conduit 20.

In one particular method, to change the position of the first valve 12, the appropriate pressure is first applied to the third conduit 22 by operating the third valve 24. For example, if it is desired to close the valve 12, the relatively increased pressure from source 48 is applied to the third conduit 22. In subsequent operations this will enable the first valve 12 to move into the second or closed position where there is no fluid communication between conduits 14 and 16. If it is desired to open the valve 12, the relatively reduced pressure from source 46 is applied to the third conduit 22. In subsequent operations this will enable the first valve 12 to move into the first or open position where there is fluid communication between conduits 14 and 16.

After the desired pressure is applied to the third conduit 22, the fourth valve 28 is operated such that the relatively reduced pressure from source 30 is applied through the fifth conduit 32, the fourth valve 28 and the fourth conduit 26 to a side of the flexible member 52 adjacent the second recessed surface 58 comprising the second valve 18. Since the absolute pressure provided by the source 30 is approximately less than any other pressure in the embodiment 10, the flexible member 52 comprising the second valve 18 moves toward the second recessed surface 58 comprising the second valve 18. Fluid communication between the third conduit 22 and the control conduit 20 has been established. It is to be noted that, in some embodiments, the order of the previous two operations may be reversed. That is, the fourth valve 28 may be operated first so as to enable conduit 22 to be fluidicly connected to memory conduit 20, followed by the actuation of valve 24 to select the pressure state to be present in the memory conduit. In this embodiment, however, the pressure state originally present in conduit 22 should match the pressure state of the memory conduit 20 to prevent unintentional changing of the position of valve 12.

The pressure now present in the control conduit 20 determines the position of the first valve 12 as determined by the pressure applied to the third conduit 22, which, in turn, is determined by the position of the third valve 24. After the first valve 12 moves or changes position, and before the third valve 24 moves or changes position, the fourth valve 28 may be moved toward its first position. Moving the fourth valve 28 toward its first position fluidly connects the source 34 of relatively increased pressure to the fourth conduit 26 through the sixth conduit 36 and the fourth valve 28. Application of the relatively increased pressure from source 34 moves the flexible member 52 toward the first recessed surface 56 of the second valve 18. Fluid communication between the third conduit 22 and the control conduit 20 is interrupted or reduced. With the second valve 18 in this position, the control conduit 20, whose pressure was equal to the pressure present in the third conduit 22, is fluidly isolated. The first valve 12 remains in its desired position irrespective of further changes of the pressure, caused by operation of the third valve 24, in the third conduit 22.

Since the second valve 18 holds or maintains a pressure condition in the control conduit 20 and thereby holds or maintains the position of the first valve 12, the valve 18 may be referred to as a "latch valve." Since moving or changing the position of the second valve 18 depends upon operation of the fourth valve 28, the fourth valve 28 may be referred to as an "enable valve" and the fourth conduit 26 may be referred to as an "enable line." Since, the third valve 24 determines the position to which the first valve 12 changes or moves, when the second valve 18 is open or enabled, the third valve 24 may be referred to as a "data valve" and the third conduit 22 may be referred to as the "data line." These terms are used to describe an exemplary embodiment 60 illustrated in FIG. 3 which is provided to facilitate understanding only. The enable valves 28 and the data valves 24 may be, in one embodiment, electrically powered solenoid valves. In a particular embodiment, the solenoid valves are Lee Valve Model LHDX0501650A (Westbrook, Conn.).

Referring to FIG. 3, sixteen valve pairs 62 are illustrated. Each valve pair comprises a first valve 12 and a second valve 18 and a memory conduit 20 between them superimposed on each other and collectively labeled 62. Multiple valve pairs 62 share a solenoid valve. In the illustrated embodiment, the sixteen valve pairs 62 are arranged in a matrix fashion, with their enable lines 26 fluidly connected to four enable valves 28 (solenoid valves in this embodiment) and their data lines 22 fluidly connected to four data valves 24 (solenoid valves in this embodiment). Fewer solenoid valves are required to control the array of first valves 12, thereby possibly producing a less expensive valve array control structure.

Any desired valve alignment or arrangement of valve operating positions may be achieved. For example, the valve pairs 62 in the leftmost "column", as viewed, may be operated by moving the data valves 24 to the desired valve 24 positions. Then, the leftmost, as viewed, enable valve 28 is actuated, so that only the first valves 12 associated with the leftmost valve pairs move toward the positions determined by the four data valves 24. A similar procedure may be used for each column of valve pairs 62, thereby producing any desired valve alignment. In this configuration, a total of four enable valves and four data valves, 28 and 24, respectively, control sixteen valve pairs 62. In a five by five configuration, a total of five enable valves and five data valves, 28 and 24, control twenty-five valve pairs 62.

To change the position of a desired number of valves that is less than the total number of valve pairs 62, only some of the columns may need to be operated. It is possible to group the individual valves in columns to perform a particular application with a reduced number of valve operations. In order to provide more favorable groupings or arrangements of valves, more than one second valve 18 may be operatively or fluidly associated with a particular first valve 12. It is also possible to fluidly associate more than one first valve 12 with a particular second valve 18, if all first valves 12 so associated always operate conjointly or in tandem.

Maintenance of the position of the first valve 12 is due to the maintenance of pressure in the control conduit 20. Operation of a particular array of valves may require a particular memory conduit to maintain a pressure state for an extended time. To maintain the position of a first valve 12 for an extended time period, it may be desirable to periodically refresh the pressure state in memory conduit 20 by performing a valve operation procedure that refreshes or recharges the pressure state in memory conduit 20. Alternatively, increasing volume of the memory conduit 20, may increase the volume of pressurized fluid, which may maintain the position of a given first valve 12 for extended time periods without refreshment of the pressure within the memory conduit 20. However, this method might decrease response time of the embodiments 10 and 60 to desired valve position changes.

A finite amount of time may be needed for the third valve 24 and the fourth valve 28 to operate, for the pressures in conduits 20, 22 and 26 to change, and for the valves 12 and 18 to operate. It may be desirable to include time delays in valve operating sequences. Duration of the time delays may vary, e.g. with geometry or proximity of the valve pairs 62 (particularly the dimensions of conduits 20, 22, and 26), the pressures provided by sources 30, 34, 46 and 48, and the specific operating characteristics of the valves 12, 18, 24 and 28. In an exemplary embodiment, a time delay of about 0.02 seconds is inserted between operation of the third valves 24 and operation of the fourth valves 28, a time delay of about 0.04 seconds is inserted between subsequent operations of the fourth valves 28, and a time delay of about 0.02 seconds is inserted between operation of the fourth valves 28 and further operation of the third valves 24.

In still a further embodiment, it is possible to have the third valve 24 directly control the position of the first valve 12. Specifically, the fourth valve 28 may be operated such that the source 30 of relatively reduced pressure is fluidly connected with the fourth conduit 26 through the fifth conduit 32 and the fourth valve 28. Responsively, the second valve 18 is operated such that the third conduit 22 communicates fluidly with the control conduit 20. In other words, the second valve 18 is maintained in its first position thereby allowing fluid communication between the first valve 12 and the third valve 24. The third valve 24 can be repeatedly operated such that the third valve 24 sequentially fluidly connects the source 46 of relatively reduced pressure and the source 48 of relatively increased pressure to the third conduit 22 and to the control conduit 20. Accordingly, the first valve 12 changes position dependent upon which source 46 or 48 is fluidly connected with the third conduit 22 by the third valve 24.

What is claimed is:

1. A valve control comprising:

(a) a first valve fluidly connected with a first fluid conveying conduit and a second fluid conveying conduit, the first valve being movable between a first position where fluid communicates between the first fluid conveying conduit and the second fluid conveying conduit and a second position where no fluid communicates between the first fluid conveying conduit and the second fluid conveying conduit;

(b) a memory conduit fluidly connected with the first valve for maintaining the first valve in the first position or the second position due to a pressure state of the memory conduit generated by a pressure source; and (c) a second valve fluidly connected with the first valve and the memory conduit, the second valve being movable between a first position for moving the first valve between the first position and the second position and a second position for maintaining the pressure state of the memory conduit for selectively keeping the first valve in a selected one of the first position and the second position depending upon the pressure state of the memory conduit generated by a pressure source.

2. A method of controlling a valve, the method comprising the steps of:

(a) fluidly connecting a first valve with a first fluid conveying conduit and a second fluid conveying conduit;

(b) moving the first valve between a first position where fluid communicates between the first fluid conveying conduit and the second fluid conveying conduit and a second position where no fluid communicates between the first fluid conveying conduit and the second fluid conveying conduit;

(c) fluidly connecting a second valve with the first valve;

(d) fluidly connecting a memory conduit fluidly between the first valve and the second valve for maintaining the first valve in the first position or the second position; and (e) moving the second valve to a first position to move the first valve between the first position and the second position; and (f) moving the second valve to a second position to maintain a pressure state of the memory conduit generated by a pressure source for selectively keeping the first valve in a selected one of the first position and the second position depending upon the pressure state of the memory conduit.

* * * * *